Sept. 8, 1931.    C. W. VAN RANST    1,822,252
GEAR SHIFT MECHANISM FOR AUTOMOBILES
Filed March 9, 1929    3 Sheets-Sheet 1
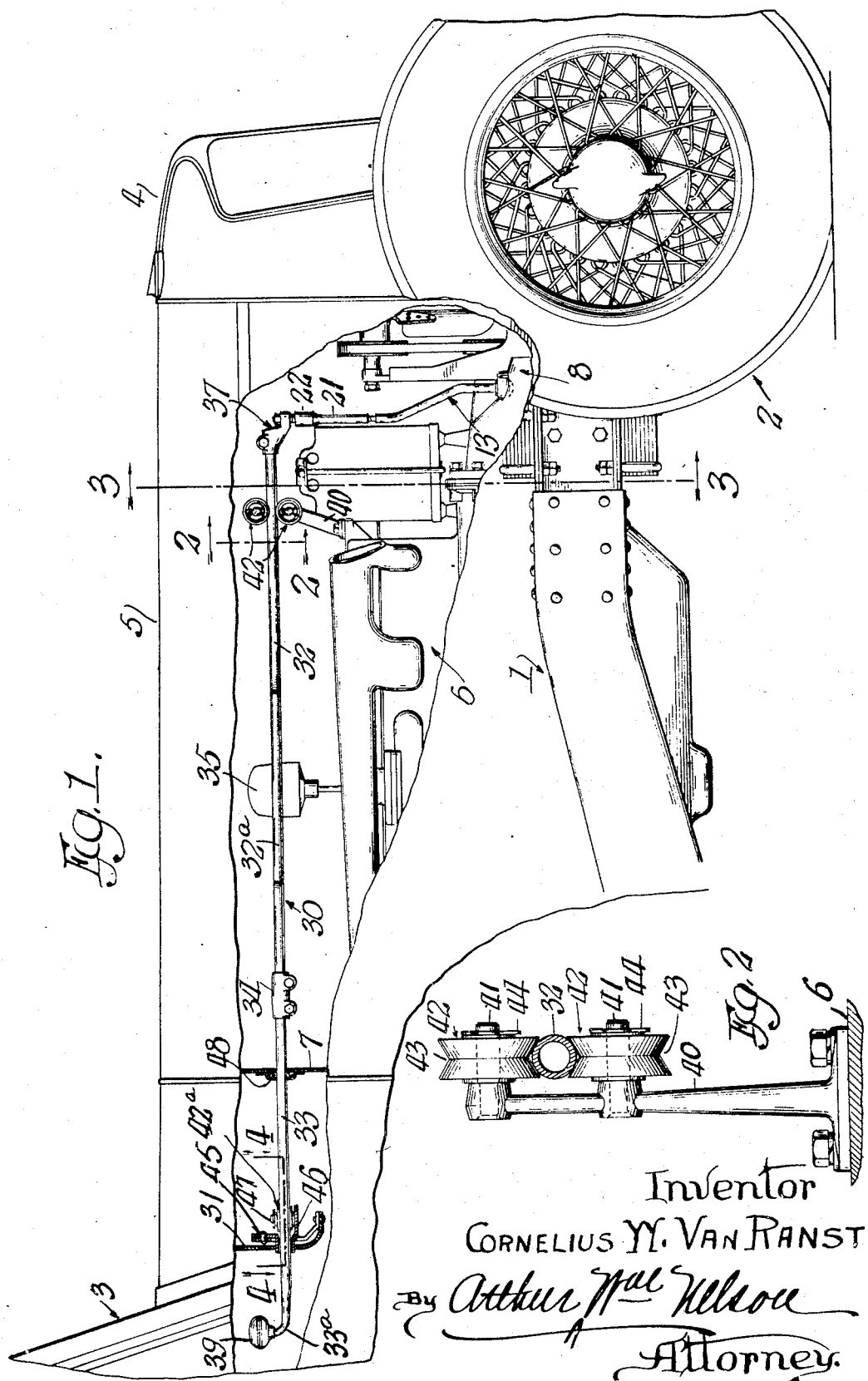

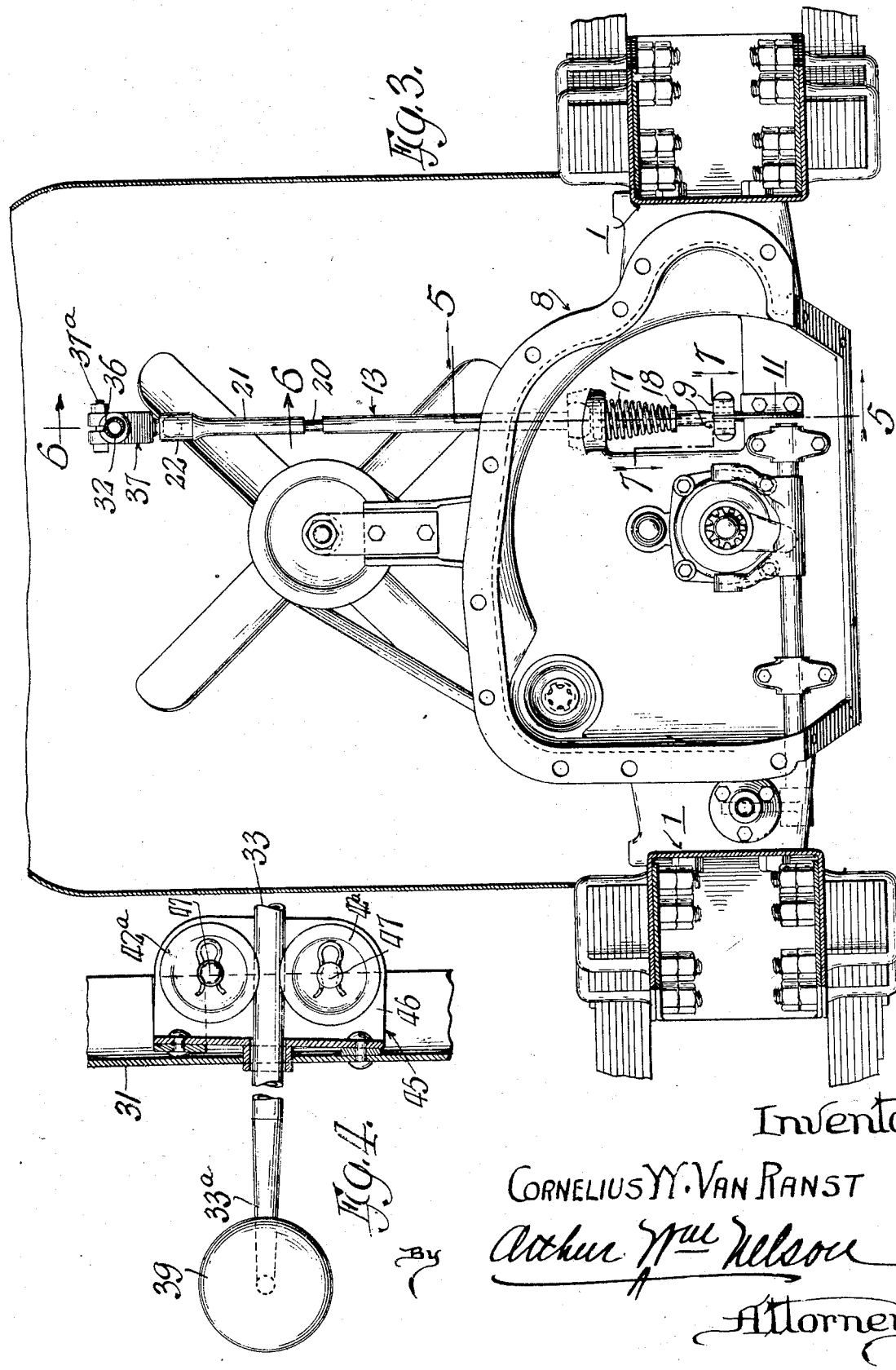

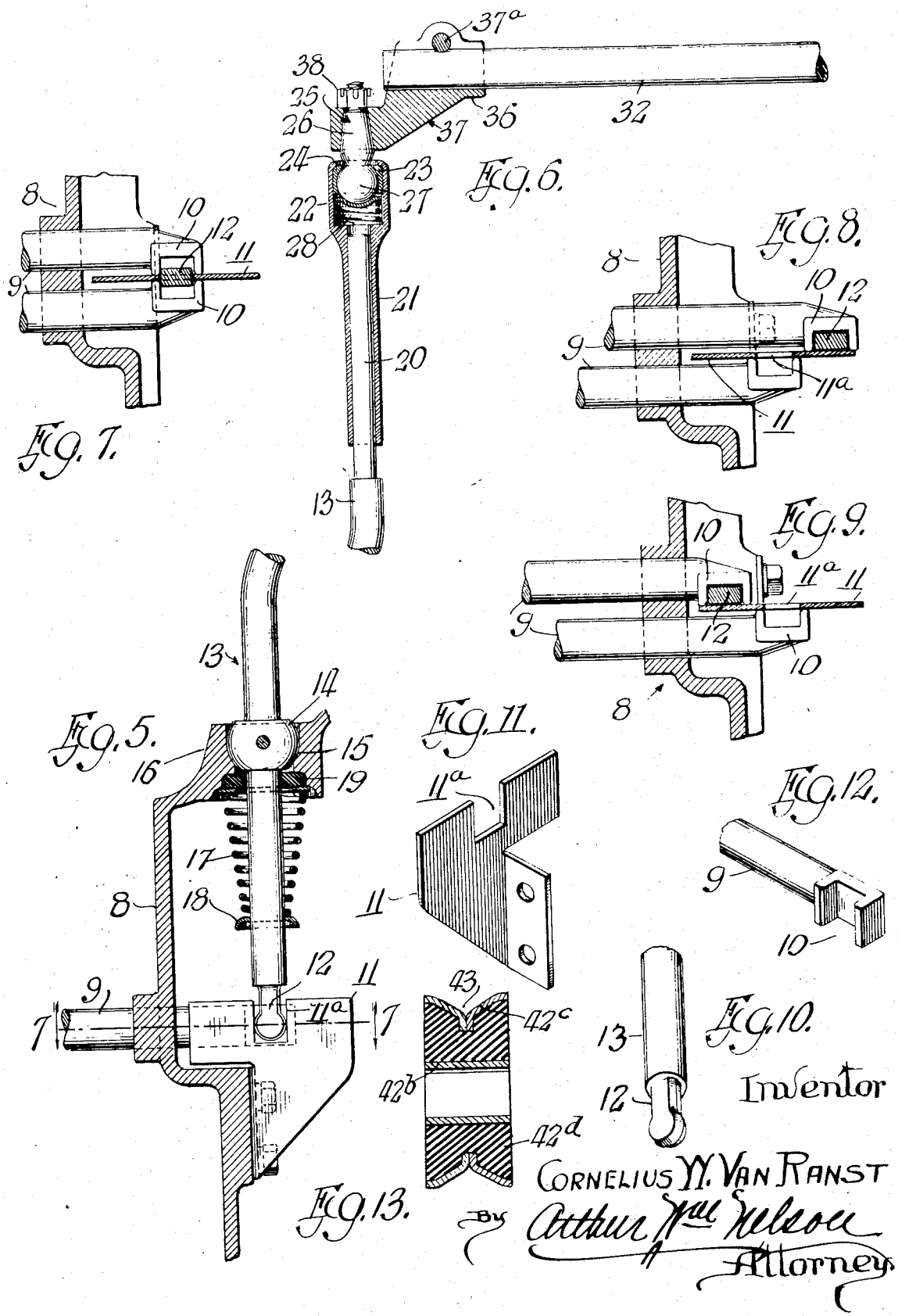

Patented Sept. 8, 1931

1,822,252

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

GEAR SHIFT MECHANISM FOR AUTOMOBILES

Application filed March 9, 1929. Serial No. 345,798.

This invention relates to improvements in gear shift mechanism for automobiles and it consists of the matters hereinafter described and more particularly pointed out in the appended claim.

In front drive automobiles with the transmission gearing located forwardly of the engine, difficulty is presented in providing simple and efficient means operable from the driver's seat for shifting the gears of said transmission into the desired speeds.

The primary object of the invention is to provide simple and efficient means, including a handle or knob disposed convenient for the driver, for shifting the transmission gears of a front drive automobile.

Another object of the invention is to provide a mechanism for this purpose, whereby the gear shifting lever of the transmission may be moved laterally as well as forwardly and rearwardly, by means extending through the instrument board of the automobile, thus eliminating parts from the floor of the automobile adjacent the vicinity usually occupied by the feet of the driver.

Still another object of the invention is to provide such a gear shift mechanism, as includes an actuating rod above the engine, so mounted as to be journalled for both a turning as well as a longitudinal movement which rod is operatively connected at one end to the gear shift lever and projects at its other end through the instrument board within convenient reach of the driver.

Still a further object of the invention is to provide a mechanism of this kind, which is strong and sturdy in construction and consists of but a minimum number of parts so disposed as to be readily assembled and at the same time is quiet and efficient in operation.

These objects of the invention, as well as others, together with the many advantages thereof will more fully appear as I proceed with my specification.

In the drawings:—

Fig. 1 is a view in side elevation of the forward end of a front drive automobile embodying one form of my improved gear shift mechanism, with parts broken away to more clearly show the construction thereof.

Fig. 2 is a detail, transverse vertical sectional view through a portion of the mechanism as taken on the line 2—2 of Fig. 1.

Fig. 3 is a transverse vertical sectional view through the mechanism as taken on the line 3—3 of Fig. 1.

Fig. 4 is a horizontal detail sectional view as taken on the line 4—4 of Fig. 1.

Fig. 5 is a vertical sectional view through the bottom end of the gear shifting lever of the transmission as taken on the line 5—5 of Fig. 3.

Fig. 6 is a vertical sectional view through the top end of the gear shifting lever of the transmission and associated parts as taken on the line 6—6 of Fig. 3.

Fig. 7 is a horizontal detail sectional view as taken on the line 7—7 of Fig. 3.

Figs. 8 and 9 are views similar to Fig. 7 with some of the parts thereof in changed positions.

Figs. 10, 11 and 12 are detail perspective views of parts embodied in the transmission and which will be more fully referred to later.

Fig. 13 is a cross sectional view through a certain roller embodied in my improved mechanism and which will be more fully referred to later.

Referring now in detail to that embodiment of the invention illustrated in the accompanying drawings:—1 indicates one of the side frame members of the chassis of a front drive automobile, 2 indicates one of the front wheels of the automobile and 3 indicates the body of the automobile. 4 indicates the radiator shell and 5 indicates the hood disposed between the body and radiator shell.

6 indicates as a whole the engine of the automobile supported in any suitable manner from the side frame members of the chassis and located under the hood forward of the dash 7 of the body. To the front end of the crank case of the engine is secured the casing or housing 8 of the transmission in which is slidably journalled, a pair of shift rods 9—9 by which the relation of the gearing of the transmission (not shown) may be changed upon actuation of either rod. Each rod is laterally forked at one end as at 10 and the last mentioned end of both rods are separated by a plate 11 secured to the inside of the casing. In said plate is an upwardly opening notch 11a in which the bottom end 12 of a shift lever 13 is disposed when the transmission gearing before mentioned is in neutral.

The shift lever 13 is provided at a point a suitable distance above its bottom end with a part of a sphere or ball 14 that engages in a socket 15 formed in a part 16 of the top wall of the transmission casing. A helical expansion spring 17 surrounds that part of the lever below the casing part 16 and a washer 18 on said lever part to normally hold the ball part 14 in the socket 15, a gasket 19 being provided in the wall part 16 below the socket to prevent admission of dust and the like into the transmission at this point.

From the above it is apparent that the lever 13 may be swung about the ball and socket connection before mentioned so that its bottom end may be swung out of the neutral position in the notch 11a in the plate 11 into engagement with the forked end of the desired rod so that the desired speed or gear change in the transmission may be selected.

That part of the lever 13 above the ball part 14 is offset rearwardly and the top end of said lever which is made straight is reduced in diameter to provide a stem 20. Slidably as well as rotatively mounted on said lever stem 20 is a tube 21, the top end of which is enlarged in diameter to form a head 22. In the top end of said head is located a bearing member or washer 23 which is secured in place by upsetting the top end of said head to form an inwardly extending flange thereover as at 24 in Fig. 6.

Associated with the head is a stud 25 having a tapered top end 26 and a ball 27 on its bottom end, which ball bears in a socket like opening in the washer 23. A part of said ball projects below the washer 23 to be engaged by a spring pressed plate 28 in the head to snugly hold the ball in the washer and the washer up against the shoulder 24.

Means is provided in connection with the structure just described whereby the lever 13 may be oscillated or rocked in the proper direction for the selected speed, which means is operable from the body 3 of the automobile in a position most convenient for the driver and such means is as follows:—30 indicates as a whole a longitudinally extending actuating rod which is operatively connected at one end to the shift lever 13 as will later appear and extends at its other end through the instrument panel or board 31 located in the usual position in the body. Preferably for ease of assembly this rod is made of two sections, namely a front end section 32 and a rear end section 33, detachably connected together forward of the dash by a coupling or clamp 34. In the particular structure shown herein, the distributor 35 of the engine is disposed above the same and the rod section 32 is offset laterally as at 32a to avoid the same as best shown in Fig. 1.

The front end of the front rod section 32 is removably secured in the split sleeve end 36 of an angle arm 37, the other end of which is secured to the tapered top end 26 of the stud 25 by a nut 38. The split sleeve 36 includes a clamping bolt 37a by which the sleeve is secured to the rod section end in a manner preventing relative endwise or turning movement between the two parts just mentioned.

The rear end 33a of the rear rod section 33 extends through the instrument panel or board 31 where it is then turned upwardly and has secured thereto a knob or handle 39.

In the actuation of the rod for the purpose of operating the shift lever 13, said rod is capable of both a turning or rocking movement in both directions, as well as a longitudinal movement in both directions. As this rod is of substantial length, means is provided at certain intervals in the length thereof to provide bearings therefor to accommodate the movements imparted thereto and which bearings also reduce vibrations of said rod.

On the front end of the cylinder block of the engine is secured an upright standard 40 having vertically spaced, laterally extending studs 41—41 at its top end. Rotatively mounted on each stud is a roller 42 having a V shaped groove 43 in its periphery, the rollers being held upon their associated studs by spring pins 44. The rod section 32 bears between the adjacent peripheral parts of the rollers 42—42 as best shown in Fig. 2 and although said rod may be rocked or turned in either direction as well as moved endwise in either direction, it cannot be displaced therefrom.

On the instrument board or panel is secured an angle plate 45 the horizontal flange 46 of which carries laterally spaced upright studs 47—47 upon which is journalled a pair of rollers 42a—42a between which the rod section 33 engages, said rollers being similar to the rollers 42 before mentioned.

To eliminate noise and reduce vibration, said rollers are rubber mounted as shown in Fig. 13, that is each roller includes a metal hub 42b, a metal rim 42c and a body of rubber or the like 42d between the two. Although the rubber body is molded to the hub and rim, it is of a resilient character.

By turning the knob 39 laterally in one direction or the other, the rod 30 is rocked, so that through the arm 37, the lever 13 is rocked laterally in the other direction. This removes the lever 13 from neutral position in the recess 11ª of the plate 11 to the selective position and into engagement with the desired shifter rod 9 after which the rod 30 is moved longitudinally in the proper direction to complete the shifting of the gears to give the desired speed change in the transmission. By reason of the disposition of the rollers 42—42ª, a universal bearing is provided for the rod 30 and one in which there is no noise or vibration. Where the rod section 33 passes through the dash 7 I provide a packing 48 of felt or the like.

The construction described provides a simple and efficient mechanism for shifting the gears of the transmission 8 in a front drive automobile wherein that part of the mechanism grasped by the driver for operating the shift lever, is remote therefrom. The parts are formed and arranged for easy assembly and are reduced in number to a minimum and are quiet and easy of operation.

While in describing my invention I have referred in detail to the specific structure herein shown, the same is to be considered merely as illustrative so that I do not wish to be limited thereto except as may be specifically set forth in the appended claim.

I claim as my invention:—

In a front drive automobile, an engine and a transmission forward thereof including a gear shift lever, an instrument board located rearwardly of the engine, a longitudinal rod operatively connected at one end of said shift lever, a pair of grooved rollers adjacent the forward end of the rod between which a portion of said rod extends in a manner providing bearings therefor for both a rocking as well as a longitudinal movement, means for supporting said grooved rollers in a vertical plane, another pair of grooved rollers located at the other end of the rod for providing a similar bearing for that end of the rod, means for supporting said rollers in a horizontal plane, and a handle at the rearward end of the rod.

In testimony whereof, I have hereunto set my hand, this 6th day of March, 1929.

CORNELIUS W. VAN RANST.